United States Patent
Song et al.

(10) Patent No.: US 9,711,295 B2
(45) Date of Patent: Jul. 18, 2017

(54) DYE-SENSITIZED SOLAR CELL MODULE AND METHOD OF MANUFACTURING THE SAME

(71) Applicant: Hyundai Motor Company, Seoul (KR)

(72) Inventors: Mi Yeon Song, Seoul (KR); Won Jung Kim, Seoul (KR); Ki Chun Lee, Seoul (KR); Sang Hak Kim, Seoul (KR); Ji Yong Lee, Gyeonggi-do (KR); Yong Jun Jang, Gyeonggi-Do (KR); Yong-Gu Kim, Gyeonggi-Do (KR); In Woo Song, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/933,041

(22) Filed: Nov. 5, 2015

(65) Prior Publication Data

US 2016/0071657 A1    Mar. 10, 2016

Related U.S. Application Data

(62) Division of application No. 13/445,302, filed on Apr. 12, 2012, now Pat. No. 9,190,219.

(30) Foreign Application Priority Data

Nov. 30, 2011 (KR) .................. 10-2011-0126565

(51) Int. Cl.
   *H01G 9/20* (2006.01)
(52) U.S. Cl.
   CPC ......... *H01G 9/2081* (2013.01); *H01G 9/2077* (2013.01); *H01G 9/2031* (2013.01); *H01G 9/2059* (2013.01); *Y02E 10/542* (2013.01)

(58) Field of Classification Search
   CPC .. H01G 9/2022; H01G 9/2068; H01G 9/2077; H01G 9/2081; H01G 9/20
   See application file for complete search history.

(56) References Cited

U.S. PATENT DOCUMENTS

| | | |
|---|---|---|
| 2001/0004901 A1 | 6/2001 | Yamanaka et al. |
| 2004/0238026 A1 | 12/2004 | Miyoshi |
| 2007/0186968 A1 | 8/2007 | Nakauchi et al. |
| 2009/0302760 A1 | 12/2009 | Tchakarov et al. |
| 2010/0269892 A1 | 10/2010 | Yoneya et al. |
| 2011/0032716 A1 | 2/2011 | Burton |

(Continued)

FOREIGN PATENT DOCUMENTS

| | | |
|---|---|---|
| CN | 101009336 A | 8/2007 |
| CN | 101904045 A | 12/2010 |
| JP | 2002094087 A | 3/2002 |

(Continued)

*Primary Examiner* — Bethany L Martin
(74) *Attorney, Agent, or Firm* — Mintz Levin Cohn Ferris Glovsky and Popeo, P.C.; Peter F. Corless

(57) ABSTRACT

Disclosed is a dye-sensitized solar cell module and a method of manufacturing the same. More specifically a counter electrode has connection parts formed within the side surfaces of the transparent conductive substrates. Edges of the working electrode and the counter electrode are bonded with each other by a sealant along the outer peripheral except for at one or more portions of the edges to form an electrolyte injection port. An electrolyte is then injected through the electrolyte injection hole into a space between the working electrode and the counter electrode. The electrolyte injection hole is then sealed by a sealant.

3 Claims, 6 Drawing Sheets

(56) References Cited

U.S. PATENT DOCUMENTS

2011/0277807 A1    11/2011    Yang

FOREIGN PATENT DOCUMENTS

| JP | 2005174934 A | 6/2005 |
| KR | 10-0995073 | 10/2005 |
| KR | 10-0567331 | 2/2006 |
| KR | 10-2010-0008068 | 1/2010 |
| KR | 10-1002398 | 7/2010 |
| KR | 10-2011-0103734 | 9/2011 |

DYE-SENSITIZED SOLAR CELL MODULE AND METHOD OF MANUFACTURING THE SAME

CROSS-REFERENCE TO RELATED APPLICATION

This application is a divisional application of U.S. application Ser. No. 13/445,302, filed Apr. 12, 2012 which claims under 35 U.S.C. §119(a) the benefit of Korean Patent Application No. 10-2011-0126565 filed on Nov. 30, 2011, the entire contents of which are incorporated herein by reference.

BACKGROUND (a) Technical Field

The present invention relates to a dye-sensitized solar cell module and a method of manufacturing the same. More particularly, the present invention relates to a dye-sensitized solar cell module, which improves the panel performance and efficiency by increasing the effective cell area, such as the area of photo-electrodes, with respect to the panel area in a constructed panel in comparison with the prior art, and a method of manufacturing the same.

(b) Background Art

In recent years, as global warming is becoming a serious problem, technologies for utilizing environmentally friendly energies have begun emerging. Among them, the most environmentally friendly field is the solar cell field which utilizes a new and renewable energy. Solar cells utilizes silicon solar cells, thin film solar cells (which use inorganic materials such as CIGS(Cu(InGa)Se$_2$ (copper indium gallium selenide) and CdTe (cadmium telluride)), dye-sensitized solar cells, organic solar cells, and organic-inorganic hybrid solar cell.

Among these types solar cells, silicon solar cells have already been widely used commercially in various fields such as houses and industrial plants, but their price and installation costs are prohibitively expensive for use on products such as vehicles and machinery.

On the other hand, dye-sensitized solar cells are inexpensive compared to silicon solar cells and can achieve semi-transparent designs or other various designs. Such dye-sensitized solar cells may be applied not only to houses but also to building integrated photovoltaic (BIPV) power generation systems like silicon solar cells, and may be applied to various fields including electronic industrial fields such as home appliances, portable electronic devices, and vehicles.

These dye sensitized solar cell systems typically include a system for generating electricity by using a photoelectric conversion mechanism. This photoelectric conversion mechanism is configured to absorb visible light from a Ru-based pigment adsorbed by a TiO$_2$ electrode and then formed into a photocurrent.

FIG. 1 is a cross-sectional view illustrating a conventional dye-sensitized solar cell module. As illustrated, the dye-sensitized solar cell module 1 includes a working electrode 10 on which a photo-electrode 12 to a which a dye is adsorbed is stacked, a counter electrode 20 on which a catalytic electrode 22 is stacked, and an electrolyte 30 filled within a sealed space between the working electrode 10 and the counter electrode 20.

The exemplary dye-sensitized solar cell module 1 includes: a photo-electrode 12 (i.e., a semiconductor oxide thick film) such as a TiO$_2$ electrode to which an Ru-based dye capable of absorbing light is adsorbed, the photo-electrode 12 being stacked on a transparent conductive substrate 11 of a working electrode 10; a catalytic electrode 22 formed using platinum (Pt) and stacked on a transparent conductive substrate 21 of a counter electrode 20, and an I$^-$/I$_3^-$-based electrolyte 30 filled in a space between the working electrode 10 and the counter electrode 20 sealed by a sealant 31 with the working electrode 10 and the counter electrode 20 being bonded to each other.

A collector may be formed in an interior of the dye-sensitized solar cell module to acquire necessary electric power by applying the dye-sensitized solar cell module to applications, making it possible to effectively collect the photocurrent. Then, the overall efficiency of a dye-sensitized solar cell is influenced by the size of a collector and a photo-electrode in a working electrode when modules are manufactured through the same process. Accordingly, the structures, shapes, and dispositions of collectors affect the overall efficiency of the system. Thus a collector capable of collecting photocurrent is required in an application with a large surface area.

This collector may include collector cells surrounded by a protective film, and a collector bottom portion with which the collector cells are connected. That is, in a general dye-sensitized solar cell module having a collector, in the case of the working electrode, silver collector cells (not shown) surrounded by protective films between TiO$_2$ photo-electrodes 12 are formed in a linear format on the transparent conductive substrate 11. Then, the collector cells extend to the collector bottom portion 13 stacked along a periphery of the transparent conductive substrate 11 and are integrally connected to each other.

Likewise, in the counter electrode 20 also, thin collector cells (not shown) surrounded by a protective films between the catalytic electrodes 22 are formed, and the collector cells extend to the collector bottom portion 23 stacked along a periphery of the transparent conductive substrate 21 and are integrally connected to each other.

As illustrated in FIG. 1, the collector bottom portions 13 and 23 are exposed to the outside of the module 10 in the electrodes 10 and 20, and act as electrode portions electrically connecting adjacent modules when a solar cell panel is constructed by using a plurality of solar cell modules 1.

Meanwhile, in the case of small home electronic appliances, a single dye-sensitized solar cell module is sufficient for application thereof. However, for a sunroof or a panorama roof of a vehicle, a house, etc., which requires a large area, a plurality of dye-sensitized solar cell modules should be connected in series or in parallel to each other so that they can be applied to a large area. Among them, since a window for a house has a window frame, a frame structure can be applied when a dye-sensitized solar cell module is installed within the window. However, it is impossible to apply the same frame structure as one would for a house to a structure, such as a sunroof or a panorama roof of a vehicle. Therefore, it is necessary to develop a new method for fixing a dye-sensitized solar cell module.

In the dye-sensitized solar cell module 1 as described above, a photo-electrode 12, a dye, an electrolyte 30, and a catalytic electrode 22 are disposed between transparent conductive substrates 11 and 12 of a working electrode 10 and a counter electrode 20. In manufacturing such a dye-sensitized solar cell module 1, as shown in FIG. 1, the working electrode 10 and the counter electrode 20 are first bonded to each other by a sealant 31, the electrolyte 30 is injected through an electrolyte injection port 24 formed on one side of the working electrode 10, and the electrolyte injection port 24 is sealed via a sealing glass, to complete the dye-sensitized solar cell module 1.

Once individually assembled, a plurality of such dye-sensitized solar cell modules 1 manufactured in the way described above are arranged in the form of a panel, and the electrode parts exposed outside of the modules are then connected to each other, so as to complete a solar cell panel.

FIG. 2 is a sectional view of a panel constructed using conventional dye-sensitized solar cell modules, which shows the connection between the modules. As shown, the collector bottom portions 13 and 23 are exposed outside of the dye-sensitized solar cell modules 1. When two adjacent modules are arranged in the form of a panel, the two modules 1 are assembled by making the exposed electrode portions of the working electrode 10 and the counter electrode 20 vertically engage with each other, so as to make the collector bottom portions 13 and 23 of the exposed electrode portions come into contact each other.

In order to connect the electrode portions of adjacent modules 1 with each other as described above, the electrode portions are often exposed on the outer surface of the modules. Further, the electrode portions should not be connected to each other when the outer peripheries of the working electrode 10 and the counter electrode 20 in the modules are aligned to exactly coincide with each other. Instead, the electrode portions should be connected to each other when the outer edge of the counter electrode 20 and the outer edge of the working electrode 10 are arranged at positions further outside of corresponding edges of opposite electrodes, respectively, as shown in FIG. 1.

In other words, the electrode portions are connected to each other where the right outer edge of the working electrode 10 is arranged at a position further outside of the right outer edge of the counter electrode 20 and the left outer edge of the counter electrode 20 is arranged at a position further outside of the left outer edge of the working electrode 10.

However, in the case of bonding two electrodes while preventing the two electrodes from completely overlapping on each other as described above, the exposed portions of the electrodes are fragile and impose restrictions on the design, so as to degrade the marketability.

More specifically, when constructing a solar cell panel 100 as shown in FIGS. 2 and 3 which use a plurality of solar cell modules 1, the larger the area occupied by the exposed portions of the electrodes in the entire panel area, the smaller the effective cell area, such as an area of photo-electrodes. Due to the restrictions imposed by the exposed electrode area on the effective cell area, such as the area of photo-electrodes within the entire panel area, there limitations related to increasing the panel performance and efficiency.

Further, the formation of the electrolyte injection port 24 at the counter electrode 20 in order to enable injection of electrolyte requires an additional processing step for formation of the injection port. In blocking the electrolyte injection port 24, it is necessary to use a sealing glass 25 and an adhesive agent, such as surlyn, which increases the manufacturing cost. In addition, even after the sealing glass 25 is fixed via an adhesive agent, the sealing glass 25 may be easily detached from the electrolyte injection port 24.

As a result, the conventional structure has safety problems associated with its design, such as electrolyte leakage, and the sealing glass 25 attached over the electrolyte injection port 24 on the outer surface of the counter electrode 20 may degrade the outer appearance, so as to degrade the performance and marketability of the system.

SUMMARY OF THE DISCLOSURE

The present invention provides a dye-sensitized solar cell module and a method of manufacturing the same, which removes an externally protruding electrode portion, to prevent the electrode part from breaking and improve the design and the marketability of the module.

Also, the present invention provides a dye-sensitized solar cell module and a method of manufacturing the same, which improves the panel performance and efficiency by increasing the effective cell area, such as a photo-electrodes surface area, with respect to the entire panel's surface area in a constructed panel in comparison with the prior art.

In addition, the present invention provides a dye-sensitized solar cell module and a method of manufacturing the same, which has an electrolyte injection port formed at a changed position, to improve the overall safety and quality of the module caused by the electrolyte injection port formed at a counter electrode in the conventional art, and to improve the design and the marketability of the module.

In one aspect, the present invention provides a method of manufacturing a dye-sensitized solar cell module, the method including the steps of: stacking transparent conductive material layers on a glass substrate to manufacture a transparent conductive substrate for a working electrode and a transparent conductive substrate for a counter electrode; stacking a collector and a photo-electrode on the transparent conductive substrate for the working electrode to complete the working electrode and stacking a collector and a catalytic electrode on the transparent conductive substrate for the counter electrode to complete the counter electrode while making the collectors of the transparent conductive substrates extend up to side surfaces of the transparent conductive substrates, so as to complete the working electrode and the counter electrode having connection parts formed at the side surfaces of the transparent conductive substrates; bonding edges of the working electrode and the counter electrode with each other by a sealant except for portions of the edges to form an electrolyte injection port; and injecting an electrolyte through the electrolyte injection hole into a space between the working electrode and the counter electrode and then sealing the electrolyte injection hole by a sealant, so as to complete the dye-sensitized solar cell module having the connection parts exposed to an exterior.

In another aspect, the present invention, the dye-sensitized solar cell module includes: a working electrode formed by stacking a collector and a photo-electrode to which a dye is adsorbed on a transparent conductive substrate; a counter electrode formed by stacking a collector and a catalytic electrode on a transparent conductive substrate; and an electrolyte filled in a space between the working electrode and the counter electrode sealed by a sealant. The collectors have connection parts extending from the collectors. These connection parts are formed at side surfaces of the transparent conductive substrates of the working electrode and the counter electrode.

Therefore, in a dye-sensitized solar cell module and a method of manufacturing the same according to the present invention, connection parts formed at side surfaces of modules make it possible to construct a panel by simply arranging the modules on a plane and then bonding the side surfaces of the modules to each other and removing an externally protruding electrode portion in each module, so as to increase the effective cell area. By doing so the illustrative embodiment of the present invention is able to improve the performance of the module and panel, increase the efficiency, and facilitate the boding between the modules.

Further, according to the present invention, it is possible to solve all the problems associated with the conventional art due to the outwardly extruding electrode portions for bonding between modules, which include the breaking of electrode parts, and the degradation of the design and marketability Also, according to the present invention, an electrolyte injection port is formed at an improved position by an improved method, to improve the safety, the degradation of the design, and marketability.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

Hereinafter, exemplary embodiments of the present invention will be described in detail with reference to the accompanying drawings so that those skilled in the art to which the invention pertains can easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Figure 4:
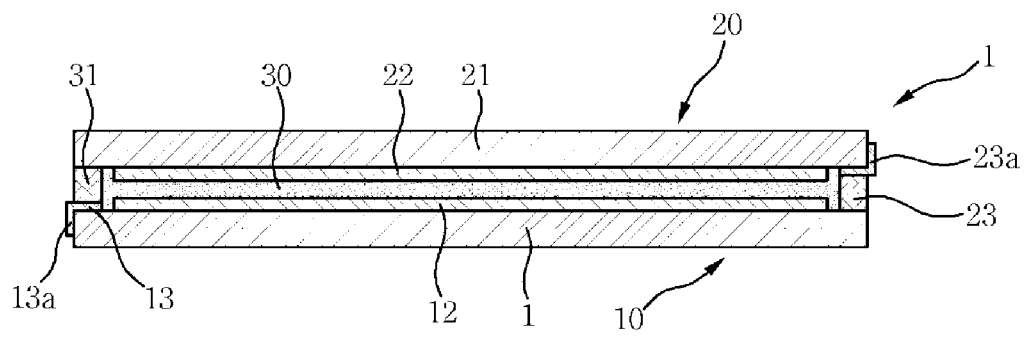
FIG. 4 is a cross-sectional view of a dye-sensitized solar cell module according to an exemplary embodiment of the present invention.
Figure 5:
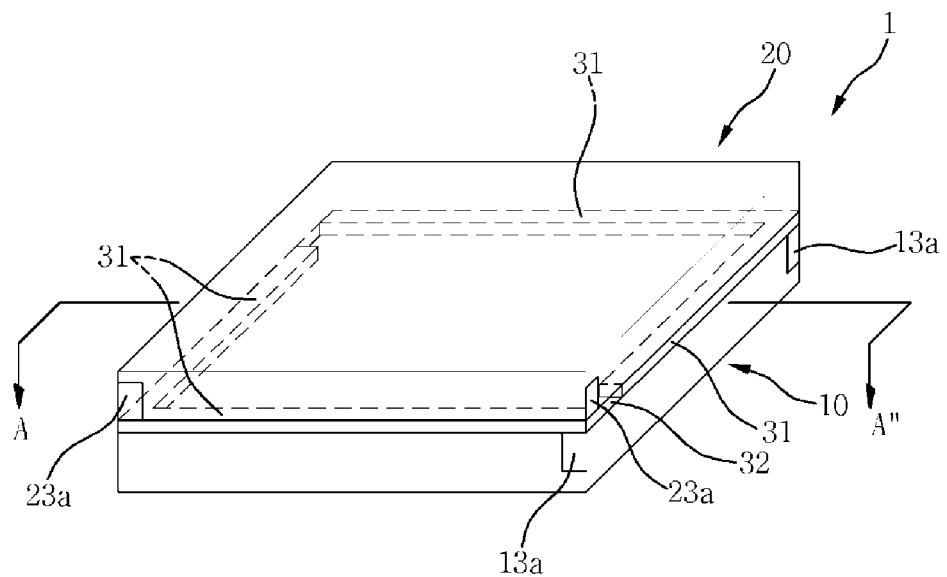
FIG. 5 is a perspective view of a dye-sensitized solar cell module according to an exemplary embodiment of the present invention.

FIG. 4 is a cross-sectional view illustrating a dye-sensitized solar cell module according to an exemplary embodiment of the present invention, and FIG. 5 is a perspective view illustrating a dye-sensitized solar cell module according to an exemplary embodiment of the present invention in a state in which an electrolyte injection port is open.

Figure 6:
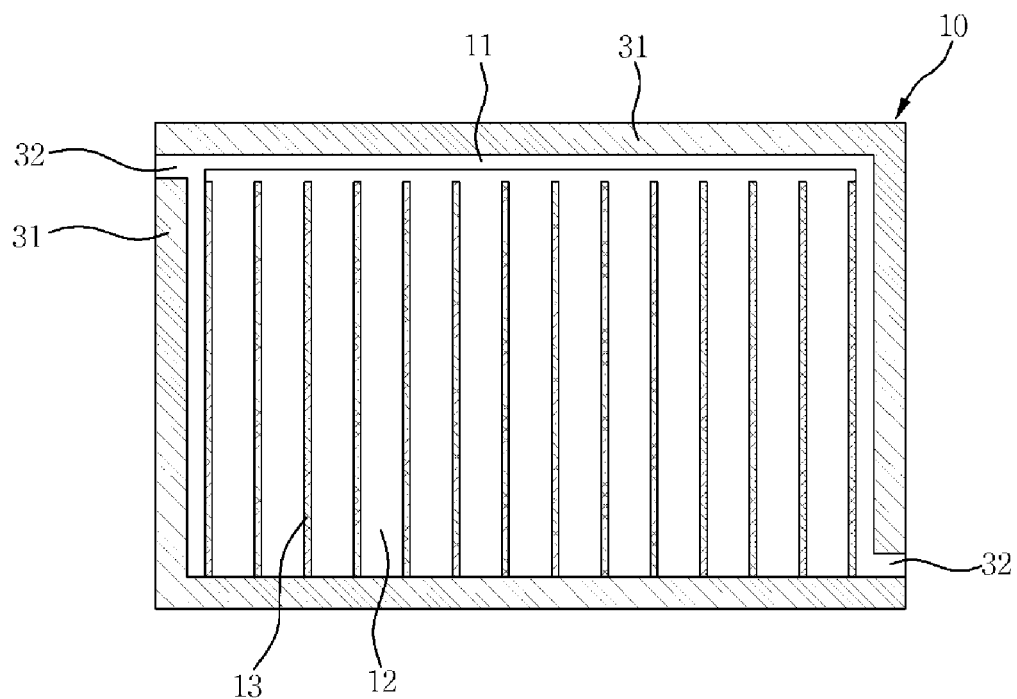
FIG. 6 is a cross-sectional view taken along line A-A' in FIG. 5.
Figure 7:
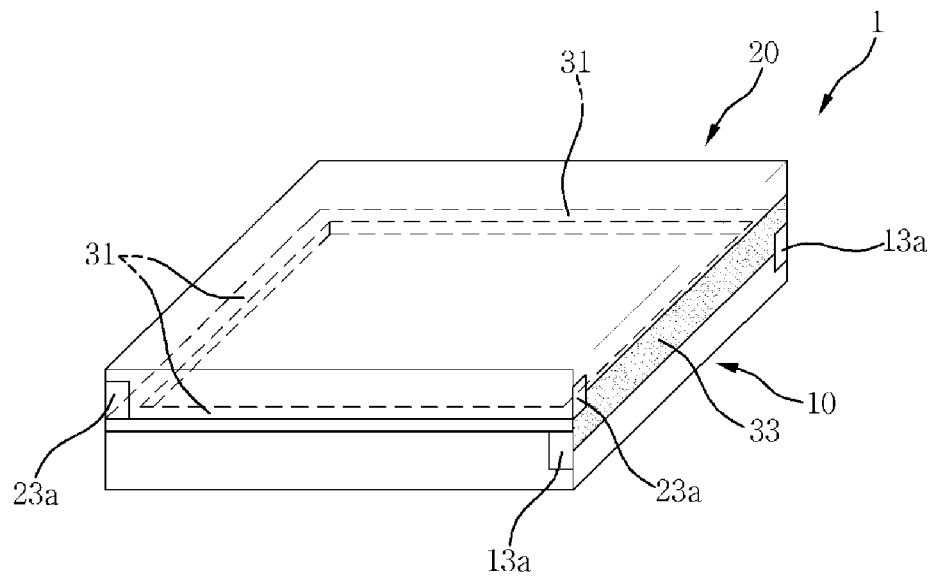
FIG. 7 is a perspective view of the dye-sensitized solar cell module shown in FIG. 5 in a state in which an electrolyte has been injected in the dye-sensitized solar cell module and an electrolyte injection port has been blocked.

Further, FIG. 6 is a cross-sectional view taken along line A-A' in FIG. 5 and shows the location of the electrolyte injection port, and FIG. 7 is a perspective view of the dye-sensitized solar cell module shown of FIG. 5 in a state in which an electrolyte has been injected in the dye-sensitized solar cell module and an electrolyte injection port has been blocked.

Figure 8:
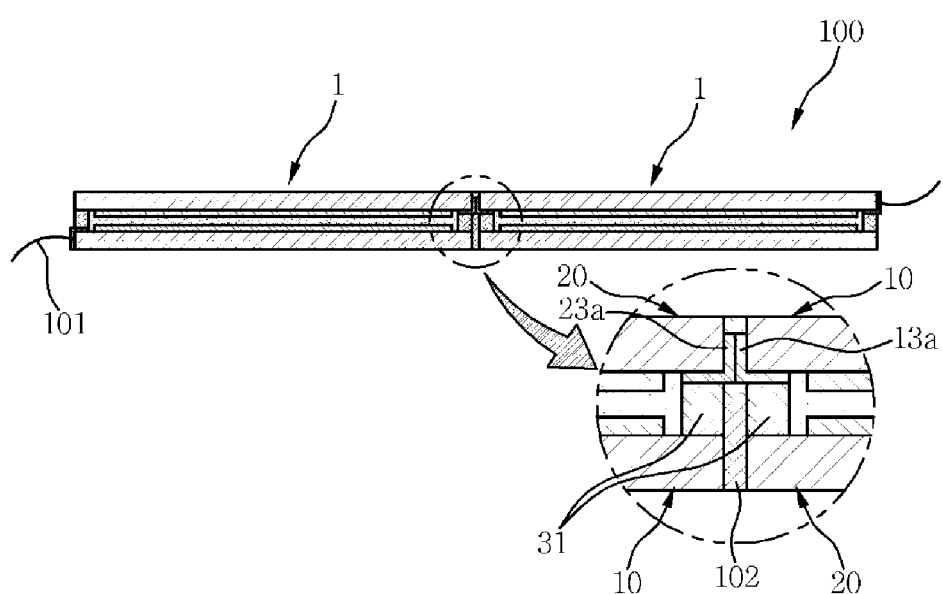
FIG. 8 is a cross-sectional view of a panel constructed by bonding two dye-sensitized solar cell modules according to an exemplary embodiment of the present invention to each other.
Figure 9:
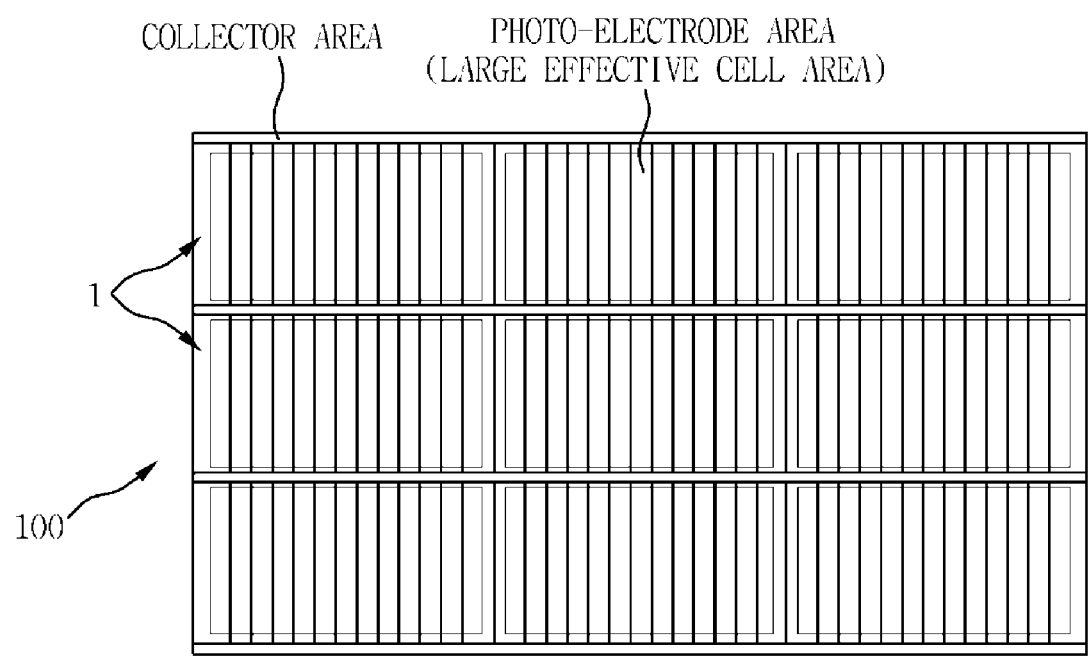
FIG. 9 is a plan view of a panel constructed using dye-sensitized solar cell modules according to an exemplary embodiment of the present invention.

In addition, FIG. 8 is a cross-sectional view of a panel constructed by bonding two dye-sensitized solar cell modules according to an exemplary embodiment of the present invention to each other, and FIG. 9 is a plan view of a panel constructed using dye-sensitized solar cell modules according to an exemplary embodiment of the present invention.

As shown in FIG. 4, most of the elements of a dye-sensitized solar cell module 1 according to the present invention are not significantly different from those of the conventional module. That is, the dye-sensitized solar cell module 1 includes a working electrode 10 on which a photo-electrode 12 having a dye (e.g., a Ru-based pigment already known to the public) adsorbed thereto is stacked, a counter electrode 20 on which a catalytic electrode 22 is stacked, and an electrolyte 30 filled within a sealed space between the working electrode 10 and the counter electrode 20. However, the formation and structure, location and formation of the electrolyte injection port and the process of sealing the electrolyte injection port are significantly different.

Hereinafter, a process of manufacturing a solar cell module will be described. First, transparent conductive substrates 11 and 21 to be used for the working electrode 10 and the counter electrode 20 are manufactured by stacking transparent electrode materials on transparent substrates such as glass substrates. Here, IZO (Indium Zinc Oxide), ITO (Indium Tin Oxide), and AZO (Aluminum doped Zinc Oxide) as well as FTO (Fluorine doped Tin Oxide) may be used as the transparent electrode material.

Thereafter, the transparent conductive substrates 11 and 12 are washed and dried, and a collector cell (not shown) and bottom portions 13 and 23 are then formed through screen printing using a known silver paste and are then again dried. Thereafter, the bottom portions 13 and 23 are heat-treated (e.g., at a temperature between 500 and 550 degrees Celsius) in a sintering furnace to be plasticized.

When the collector cell and the bottom portions 13 and 23 are formed as described above, connection parts 13a and 23a, which extend from the collector bottom portions 13 and 23 and are stacked on the transparent conductive substrates 11 and 21, respectively, are additionally formed according to the present invention. At this time, the connection parts 13a and 23a are formed on all sides of the transparent conductive substrates 11 and 21, that is, on all sides of the solar cell module 1, which are bonded to those of an adjacent module to construct a panel.

The connection parts 13a and 23a are integrally connected with the collector bottom portions 13 and 23, respectively, and each of the connection parts 13a and 23a corresponds to a part of a collector. When the module 1 has been completed, each of the connection parts 13a and 23a serves as an electrode portion exposed to the exterior at one side of the substrate (side of the module) and serves as an external electrode used for electric connection with an adjacent module in a solar cell panel 100 constructed by modules 1.

The connection parts 13a and 23a protrude out and are exposed in the lateral direction of the substrate from the collector bottom portions 13 and 23 formed on upper surfaces of the transparent conductive substrates 11 and 21 of the working electrode 10 and the counter electrode 20, respectively, so that the connection parts of adjacent modules can be connected to each other when side surfaces of the adjacent modules are bonded to each other for construction of a panel. According to an exemplary embodiment of the present invention, the connection parts 13a and 23a may be formed at corners of the modules 1 (substrates) as shown in FIGS. 5 and 7.

When the connection parts 13a and 23a are formed over the entire sides as well as the corners of the modules 1, there may be a restriction in use of an adhesive agent for bonding between the modules 1 for construction of the panel 100 as described below. That is, for bonding between modules 1, an adhesive agent should be applied on the other area except for the connection parts 13a and 23a. However, if each of the connection parts 13a and 23a are formed over the entire side of the substrate, the area of the side of the module on which the adhesive agent should be applied in order to bond the modules to each other (the areas bonded to each other by the adhesive agent for bonding of the modules) may be insufficient.

In the present invention, the adhesive agent is used for boding between modules as described above. In addition to this use, the adhesive agent is applied on an outer surface of the sealant 31 for bonding between the working electrode 10 and the counter electrode 20, so as to perform an additional sealing function to prevent leakage of an electrolyte between the working electrode and the counter electrode, further to the sealant. However, if the connection parts are formed over the entire side surfaces of the substrates, it becomes difficult to apply an adhesive agent on the outer surface of the sealant between the working electrode and the counter electrode. Therefore, in the present invention, it is not recommendable to form the connection parts 13a and 23a over the entire side surfaces or on excessively wide areas of side surfaces of the substrates, which may make it impossible to bond the modules to each other or to expect a good additional sealing function.

Further, preferably the lengths of the connection parts 13a and 23a, i.e. the vertical lengths (vertical lengths in drawings) from the upper surface of the transparent conductive substrates on which the collectors have been formed to the ends of the connection parts occupy about 50%~80% of the thickness of the substrates.

The reason for the lengths of the connection parts 13a and 23a are designed within 80% of the thickness of the substrates will be described later in detail with reference to FIG. 8.

Furthermore, although each of the lengths of the connection parts 13a and 23a may have any length, it is not preferably have too short a value (i.e., a value that is smaller than 50% of the thickness of the substrate), as this may degrade the bonding power between the connection parts of adjacent modules in a panel constructed by the modules.

Further, each of the connection parts 13a and 23a may be formed by attaching a conductive tape, instead of using silver paste like the other part of the collector as described above.

The thickness of each of the connection parts 13a and 23a may be adjusted in consideration of the thickness of the adhesive agent layer used in order to bond the sides of the modules for construction of the panel. Also, in consideration of the thickness of the adhesive agent layer, the thickness of each of the connection parts 13a and 23a may be formed to be larger than the thickness of the collector bottom portions 13 and 23 or the collector cell (i.e., much like the embodiment shown in FIG. 4).

As a result, by forming the collector cell, the collector bottom portions 13 and 23, and the connection parts 13a and 23a as described above, a pair of substrates used for a working electrode and a counter electrode are manufactured. Then, in the case of the substrate for the working electrode, a $TiO_2$ photo-electrode 12 is formed on a transparent conductive substrate 11 by screen printing, etc. and is then dried.

Further, in the case of the substrate for the counter electrode, a platinum catalytic electrode 22 is formed by applying a platinum precursor solution on a transparent conductive substrate 21 by screen printing, etc. and is then dried. Then, a protective film for a collector of each substrate is formed by using a known glass frit and is then dried, in which a screen printing can be used. Thereafter, the working electrode 10 and the counter electrode 20 are heat-treated (e.g. at 500 degrees Celsius) in a sintering furnace to be plasticized, and a dye is adsorbed to the $TiO2$ photo-electrode 12 of the working electrode 10.

In the working electrode 10 and the counter electrode 20 completed as described above, each collector cell of the collector made from silver is wrapped by a protective file and is disposed in a linear orientation between the photo-electrode 12 (in the working electrode) and the catalytic electrode 22 (in the counter electrode). The collector cells are connected to the collector bottom portions 13 and 23 lengthily stacked along the peripheries of the transparent conductive substrates 11 and 21, respectively.

Further, the collector bottom portions 13 and 23 formed at the working electrode 10 and the counter electrode 20 correspond to portions connected through the sealant 31 with matching portions of opposite electrodes within the modules 1, and the connection parts 13a and 23a formed at sides of the modules correspond to portions electrically connected with adjacent modules when the panel has been constructed. When both of the working electrode 10 and the counter electrode 20 have been completed, the working electrode 10 and the counter electrode 20 are bonded to each other by using the sealant 31, wherein typical surlyn or UV hardener may be used as the sealant 31.

Here, the UV hardener is a polymeric material which can be hardened by irradiating UV rays. By using the UV hardener, it possible to bond the working electrode and the counter electrode to each other only by irradiating UV rays without a separate heat treatment. The UV hardener may include polyacrylonitrile, polyester acrylonitrile, polymethacrylate, polymethylmethacrylate, polyurethane and polyvinyl alcohol.

At the time of bonding, in order to seal the space between the working electrode 10 and the counter electrode 20, the sealant 31 is applied along the edges of the electrodes and is then hardened, so as to bond and fix the two electrodes to each other. In the present invention, an electrolyte injection port 32 is formed by the sealant between the working electrode 10 and the counter electrode 20 as shown in FIGS. 5 and 6.

When the two electrodes 10 and 20 are bonded to each other by the sealant 31, the sealant 31 is applied on the collector, more exactly, on the collector bottom portions 13 and 23, so that the collector bottom portions 13 and 23 are adhered to those of the opposite electrodes by the sealant 31. Since the collector usually has a thickness of about 5 µm and the sealant usually has a thickness of 20 μm~100 μm, the use of the sealant on the collector does not have a significant influence on the thickness of the collector.

Once the electrodes are bonded to each other, in order to form the electrolyte injection port 32 at the sealant portion between the electrodes 10 and 20, the sealant is applied along the outer edge portion except for the portion to be used as the electrolyte injection port and then the working electrode 10 and the counter electrode 20 are then bonded to each other. When the working electrode 10 and the counter electrode 20 have been completely bonded to each other, the portion on which the sealant is not applied, i.e. the portion which is not sealed by the sealant, is open between the two electrodes 10 and 20. In other words, a gap is formed between the two electrodes and this gap serves as the electrolyte injection port 32 through which electrolyte can be injected into the space between the two electrodes 10 and 20.

FIG. 5 shows a dye-sensitized solar cell module including the working electrode 10 and the counter electrode 20 bonded to each other via the sealant 31 applied on the outer edge portion except for the two electrolyte injection ports 32. Preferably, the electrolyte injection ports 32 are formed at corners of the modules 1 (corners of the working electrode and the counter electrode) as shown in FIGS. 5 and 6, which enables the electrolyte to be uniformly filled in the entire interior space between the two electrodes.

If the electrolyte injection port is not formed at the corner portion, for example, if the electrolyte injection port is formed at a middle portion of the module, there is a high possibility that bubbles may be generated at the corner portion when the electrolyte is injected, which makes it difficult to uniformly fill the electrolyte into the entire interior space between the two electrodes and makes it more difficult to fill the electrolyte up to the corner portion as the module size increases.

As shown in FIGS. 5 and 6, when forming two electrolyte injection ports 32, it is also preferably to form the electrolyte injection ports 32 at a corner of one side of a module and at a corner of the opposite side thereof while diagonally arranging the two electrolyte injection ports 32 instead of arranging them in the same direction. This arrangement can make it possible to uniformly fill the electrolyte in the entire interior space between the two electrodes without generating bubbles in the corner portions.

Then, an electrolyte (e.g. 0.1M Lithium iodide, 0.05 M iodine, 0.6M 1,3-dimethylimidazolium iodide, 0.5 M tert-butyl pyridine/3-Methoxypropionitrile) is injected through the electrolyte injection ports 32 formed by the sealant between the working electrode 10 and the counter electrode 20, and the electrolyte injection ports 32 are then blocked to completely seal the interior space of the modules 1 in which the electrolyte has been injected. At this time, the electrolyte injection ports are sealed by using a typical solar cell sealant, which does not react with the electrolyte, such as a UV hardener.

At the time of sealing the electrolyte injection port 32, the sealant may be used at only the electrolyte injection port portion. However, it is more preferable to reseal the outer portion again to ensure continuity of the sealant.

That is, it is recommendable to reapply the sealant on an entire outer surface of the sealant to more effectively seal the space between the two electrodes again. Thus, not only are the open electrolyte injection ports 32 blocked and sealed, but also the originally applied sealant is also resealed to provide a double sealing effect.

In order to prevent the sealant from covering the connection parts 13a and 23a, it goes without saying that the sealant should be applied on the outer portions except for the connection parts 13a and 23a. By sealing the electrolyte injection ports 32, the dye-sensitized solar cell module 1 is completed. In the present invention, since the working electrode 10 does not have an electrolyte injection port, it is possible to manufacture a module having opposite surfaces with the same structure.

Further, the process of the present invention, which forms an electrolyte injection port at a sealant portion, is easier and simpler than the conventional method as described above, which separately forms an electrolyte injection port at a counter electrode made of a glass substrate.

In addition, unlike the conventional art, the present invention does not require a separate sealing glass for blocking the electrolyte injection port, which solves various problems of the conventional art associated with the user of the sealing glass, including the safety related problems, such as leakage of an electrolyte, and the degradation of the appearance and marketability.

Although not described above in detail, it goes without saying that the steps of bonding the working electrode and the counter electrode, blocking the electrolyte injection port, applying and hardening a sealant, and irradiating UV rays in the case of using a UV hardener should be performed in the same manner as those of conventional art.

The solar cell modules 1 of the present invention manufactured in the process as described above have a structure in which the electrode portions exposed to the exterior, i.e. the connection parts 13a and 23a of the collector, are located at sides of the modules. Therefore, as shown in FIGS. 8 and 9 for configuration of a panel, by bonding multiple modules 1 to each other while arranging the multiple modules 1 on a plane and connecting the connection parts 13a and 23a of adjacent modules 1 to each other, it is possible to produce an integrated solar cell panel 100.

For bonding between the modules 1, a bonding agent (indicated by 102 in FIG. 8), such as a UV hardener, epoxy, surlyn, or other glass adhesive agent, is applied and then hardened. In the case of applying the bonding agent 102 on the side surfaces of the modules and then bonding the side surfaces of the modules to each other, the electrolyte injection port 32 on the side surfaces of the modules can also be doubly sealed by the bonding agent and the sealant used at the time of the sealing as described above. Further, the bonding agent seals the outer sealant portion again except for the electrolyte injection port. Therefore, the present invention effectively prevents electrolyte leakage.

Further, by forming the connection parts 13a and 23a at corners of the modules 1 and bonding the modules to each other by applying the bonding agent 102 on the other areas except for the surfaces of the connection parts, the gap or clearance between the modules is completely blocked by the bonding between the connection parts and by the bonding agent at the other part except for the connection parts, so as to improve the marketability of the panel.

In the construction described above, the connection parts 13a and 23a have a length corresponding to a value within about 80% of the thickness of the substrate, in order to apply a boding agent (e.g., see the boding agent on the connection parts in FIG. 8) on the outer side of the connection parts (i.e., the outer side of the modules) even in the portions at which the connection parts are formed, thereby completely blocking the clearance between the modules (see the enraged portion in FIG. 8).

Furthermore, when the length of the connection parts 13a and 23a is equal to the thickness of the substrate, a short-circuit may occur between two adjacent modules and the connection parts may be seen from the outside according to the degree of printing of the electrodes. Therefore, in the present invention, the length of the connection parts 13a and 23a should preferably be limited to a value within about 80% of the thickness of the substrate.

The process of configuring a panel by bonding modules to each other according to the present invention has been described above. In the present invention in which connection parts are formed one the sides of the modules and the connection parts of adjacent modules are connected to each other in a constructed panel, it is not necessary for the electrode portions to protrude outward, unlike the prior art (i.e., the working electrode and the counter electrode completely overlap each other in the present invention).

As a result, the present invention electrode parts from breaking, eliminates limitations in the design, and helps reduce the degradation of marketability.

Further, at the time of constructing a plurality of modules, it is possible to minimize the area occupied by the electrode portions (corresponding to the connection parts) for connection between adjacent modules in the entire area of a panel and is thus possible to increase the effective cell area of the optical electrodes, thereby making it possible to improve the performance of the modules and panel and increase the efficiency (see FIGS. 8 and 9).

Figure 1:
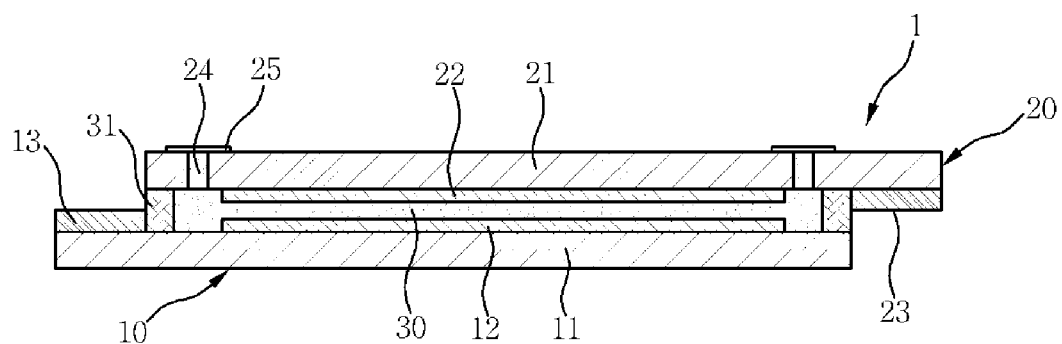
FIG. 1 is a cross-sectional view illustrating a conventional dye-sensitized solar cell module.
Figure 2:
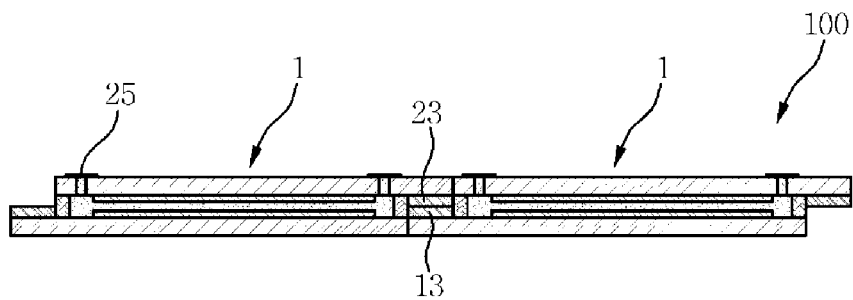
FIG. 2 is a cross-sectional view of a conventional dye-sensitized solar cell panel.
Figure 3:
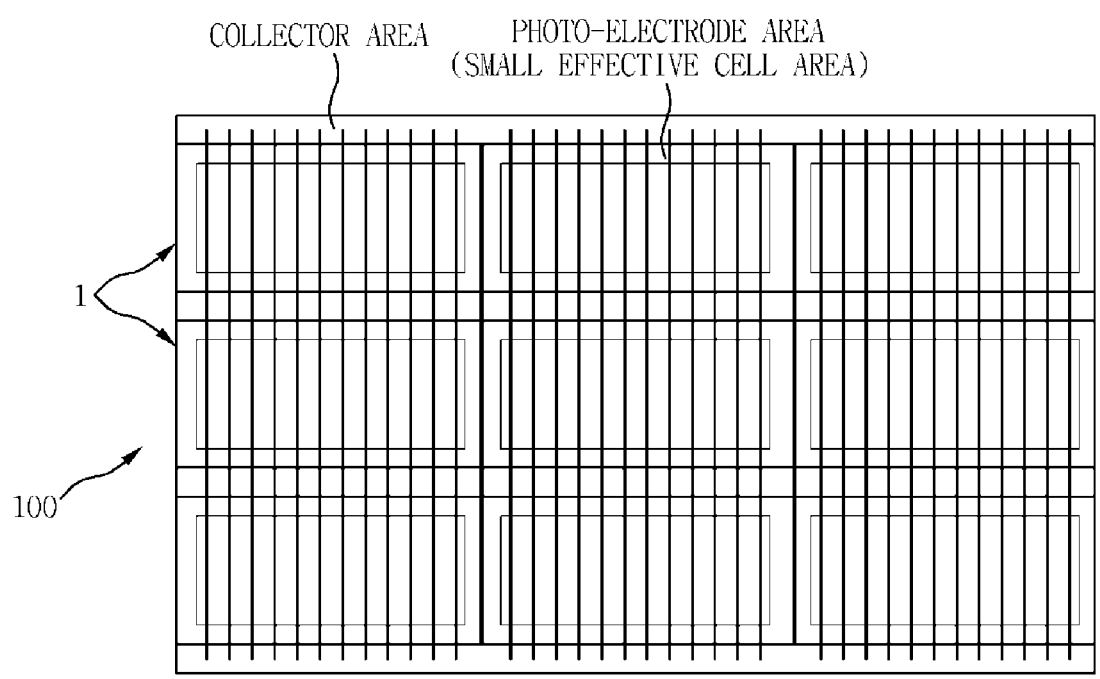
FIG. 3 is a plan view of a panel constructed using conventional dye-sensitized solar cell modules.

Moreover, while bonding a plurality of modules to each other, the present invention allows the modules to be simply arranged on a plane and then bonded to each other on the modules' respective side surfaces. Therefore, in comparison with the conventional method (see FIG. 3) in which the working electrode and the counter electrode of two adjacent modules are vertically engaged with each other, the present invention achieves a simplified bonding process between modules, an increase in the efficiency in panel manufacturing, and an improvement in the panel design.

Although an exemplary embodiment of the present invention has been described in detail, the scope of the present invention is not limited thereto but various modifications and improvements made by those skilled in the art using the basic concepts of the present invention defined in the appended claims also pertain to the scope of the present invention.

What is claimed is:

1. A dye-sensitized solar cell module, the dye-sensitized solar cell module comprising:
    a working electrode including a first collector and a photo-electrode to which a dye is adsorbed on a first transparent conductive substrate;
    a counter electrode including a second collector and a catalytic electrode on a second transparent conductive substrate;
    an electrolyte injected into a space between the working electrode and the counter electrode;
    wherein the first collector includes a first collector part disposed on a first surface of the first transparent conductive substrate, the first surface of the first transparent conductive substrate facing the second transparent conductive substrate and a first connection part extending from the first collector part, the first connection part extending along a side surface of the first transparent conductive substrate,
    wherein the second collector includes a second collector part disposed on a first surface of the second transparent conductive substrate, the first surface of the second transparent conductive substrate facing the first transparent conductive substrate and a second connection part extending from the second collector part, the second connection part extending along a side surface of the second transparent conductive substrate,
    wherein the length of the first connection part extending along the side surface of the first transparent conductive substrate is about 50% to 80% of a thickness of the side surface of the first transparent conductive substrate and the length of the second connection part extending along the side surface of the second transparent conductive substrate is about 50% to 80% of a thickness of the side surface of the second transparent conductive substrate,
    wherein a first electrolyte injection port is formed at a corner of one side of the dye-sensitized solar cell module and a second electrolyte injection port is formed at a corner of an opposite side of the dye-sensitized solar cell, wherein the first electrolyte injection port and the second electrolyte injection port are arranged in diagonally opposite positions and
    wherein a first sealant is formed along outer edges of the working electrode and the counter electrode except for at the first electrolyte injection port and the second electrolyte injection port, and a second sealant is formed at the first electrolyte injection port and second electrolyte injection port.

2. A dye-sensitized solar cell panel comprising a plurality of the dye-sensitized solar cell modules of claim 1
    wherein the plurality of the dye-sensitized solar cell modules are arranged on a plane and the first and second connection parts of adjacent dye-sensitized solar cell modules of the plurality of dye-sensitized solar cell modules are connected to each other.

3. The dye-sensitized solar cell panel of claim 2, wherein the adjacent dye-sensitized solar cell modules of the plurality of dye-sensitized solar cell module are connected and integrated with each other by a bonding agent.

* * * * *